United States Patent [19]

Beggs

[11] Patent Number: 5,113,888
[45] Date of Patent: May 19, 1992

[54] PNEUMATIC MOISTURE SENSITIVE VALVE

[76] Inventor: Robert Beggs, 1633 Truckee Way, Woodland, Calif. 95695

[21] Appl. No.: 468,841

[22] Filed: Jan. 23, 1990

[51] Int. Cl.⁵ .......................... E03B 1/00; F16K 17/36
[52] U.S. Cl. ........................................ 137/1; 137/78.3; 47/48.5
[58] Field of Search ...................... 239/1, 63; 137/78.3, 137/1; 47/48.5

[56] References Cited

U.S. PATENT DOCUMENTS

| | | | |
|---|---|---|---|
| 2,445,717 | 7/1948 | Richards | 239/63 |
| 2,674,490 | 4/1954 | Richards | 239/63 |
| 2,821,434 | 1/1958 | Hunter et al. | 299/25 |
| 2,863,698 | 12/1958 | Richards | 239/63 |
| 3,642,204 | 2/1972 | McCloskey | 239/63 |
| 3,747,399 | 7/1973 | Treirat | 239/63 |
| 3,758,987 | 9/1973 | Crane, Jr. | 47/38.1 |
| 3,874,590 | 4/1975 | Gibson | 137/78.3 |
| 3,910,300 | 10/1975 | Tal | 137/78.3 |
| 3,981,446 | 9/1976 | Hunter | 239/1 |
| 4,015,616 | 4/1977 | Hanff | 239/63 |
| 4,055,200 | 10/1977 | Lohoff | 137/624.11 |
| 4,153,380 | 5/1979 | Hartman | 47/48.5 |
| 4,214,701 | 7/1980 | Beckman | 239/63 |
| 4,274,583 | 6/1981 | Hunter | 239/1 |
| 4,648,555 | 3/1987 | Gumbmann, Jr. | 239/63 |
| 4,739,789 | 4/1988 | Hamilton | 137/78.3 |
| 4,938,248 | 7/1990 | Browne | 137/78.3 |
| 4,987,915 | 1/1991 | Goldsmith | 137/78.3 |

FOREIGN PATENT DOCUMENTS 584826  12/1977  U.S.S.R. .................. 239/63

Primary Examiner—A. Michael Chambers
Attorney, Agent, or Firm—Bernhard Kreten

[57] ABSTRACT

A method and apparatus for irrigating plant life in a manner which conserves water and optimizes soil moisture conditions. A valve is interposed between a source of water and a water outlet which is responsive to changes in soil moisture and correlative of the need for moisture in the soil. A diaphragm reciprocates between first and second positions, and the diaphragm is operatively connecting a water inlet and an outlet through a seal. The diaphragm movement is restrained by pneumatic pressure opposing the water inlet pressure. In addition, a check valve is provided whereupon a moisture sensor disposed at a terminal portion of the device directly reading moisture level in the soil allows unidirectional air flow for self-purging of the sensor.

33 Claims, 2 Drawing Sheets

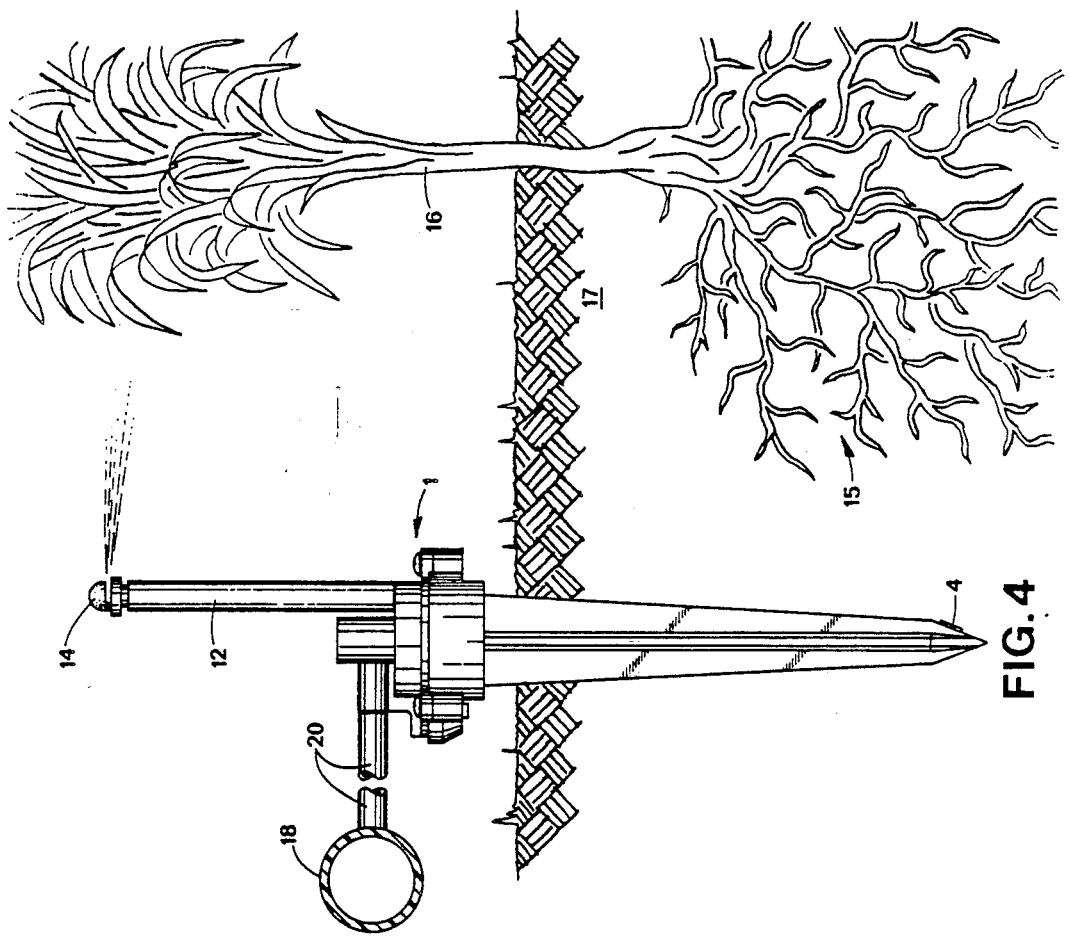
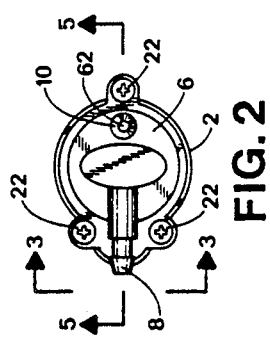
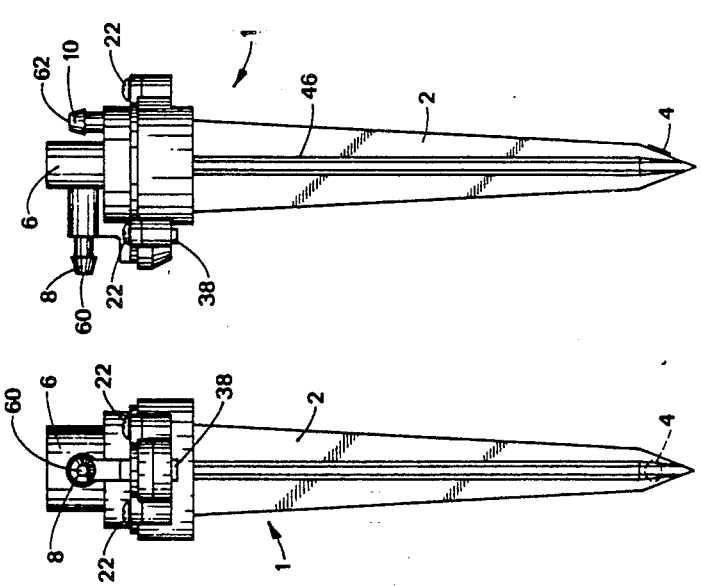

PNEUMATIC MOISTURE SENSITIVE VALVE

FIELD OF THE INVENTION

This invention relates to a fluid control valve which is sensitive to moisture content of a porous media and specifically well suited for regulating irrigation water application to plants based on soil moisture conditions.

BACKGROUND OF THE INVENTION

Plants flourish best when they are supplied with water at a rate approximately equal to their use rate. Plant water use rates are known to vary widely, depending upon weather, plant size, plant type, soil makeup and location. Under watering tends to stress plants, while over watering can cause disease and other problems. Over watering also wastes valuable water resources and can cause excess leaching of fertilizers and pesticides to groundwater. Maintaining soil moisture conditions in the ideal range for individual plant vigor has been a long recognized need in irrigated agriculture and plant husbandry. This long felt need has heretofore gone unsatisfied.

Most current irrigation systems are either operated manually or are controlled by timers operating electric solenoid valves. In most cases the timer controlled systems are set to apply the same amounts of water on schedule regardless of the actual plant water requirements. The operation of manual irrigation systems is based on the visual observations of the operator and often does not correspond to soil moisture conditions either.

Most known prior art devices have attempted to measure soil moisture at a single or very small number of locations and supply a control signal to the main timer for a large irrigated area. No readily available device exists which accurately controls irrigation on a localized scale to plants and which can be used with commercial irrigation distribution components.

The following patents reflect the state of the art of which applicant is aware, insofar as these appear germane to the patent process. These patents are disclosed with a view towards discharging applicant's acknowledged duty to disclose relevant prior art. However, it is respectfully submited that none of these patents teaches the claimed invention when considered singly, and none of the patents renders obvious the instant invention when considered in any conceivable combination.

| INVENTOR | PATENT NO. | ISSUE DATE |
| --- | --- | --- |
| RICHARDS | 2,445,717 | July 20, 1948 |
| RICHARDS | 2,674,490 | April 6, 1954 |
| RICHARDS | 2,863,698 | Dec, 9, 1958 |
| TREIRAT | 3,747,399 | July 24, 1963 |
| CRANE | 3,758,987 | Sept. 18, 1973 |
| HUNTER | 3,981,446 | Sept. 21, 1976 |
| LOHOFF | 4,055,200 | Oct. 25, 1977 |
| HUNTER | 4,274,583 | June 23, 1981 |

Tensiometer type devices, such as that found in Richards, have had the disadvantage of requiring regular maintenance for proper operation. Other devices of interest have sensed the bubbling pressure of a controlled porosity block or sensor and in turn actuated a valve or controller. Some of these devices (e.g., Hunter) require a significant elevation differential to operate and therefore must protrude high up out of the ground, leaving them in the way of cultural practices. Others (e.g., Crane and Treirat) have very special water supply or water distribution equipment requirements. The patent to Lohoff appears to be of particular interest as it uses line water pressure for operation, but relies on a complex interaction of a solenoid, multiple chambers, and contacts as a pilot for a main water control valve.

Almost all of the devices described above have the disadvantage of scheduling irrigation for a large number of plants in a wide area based on moisture measurement at a single spot. In most landscaping applications and many agricultural applications this approach can be substantially inaccurate in supplying individual plants with the proper amounts of water. Moisture regulating irrigation devices shown in prior art for use with individual plants or small groups of plants are designed with a gravity water supply tank or require ultrafiltration. These are very cumbersome for outdoor landscaping and agricultural applications.

In contrast, the instant invention is directed to a soil moisture sensitive irrigation control device which allows irrigation water to be distributed in conjunction with commercially available equipment to accurately fulfill the requirements of individual plants or small groups of plants.

SUMMARY AND OBJECTS OF THE INVENTION

Accordingly, the primary object of the present invention is to provide a simple, economical, direct acting moisture sensitive valve for remote use at individual plants or groups of plants.

It is yet a further object of the present invention to provide a device as characterized above in which no extended drain column or special low pressure water supply is required for proper operation as with other previous devices. This valve operates at standard irrigation operating pressures and is capable of regulating the supply of water to most commercially available drip or spray irrigation products.

It is yet a further object of the present invention to provide a device as characterized above that provides an entire moisture sensitive valve in one compact assembly, ready to be inserted into the soil next to plants or groups of plants, thus enhancing convenience and eliminating the chance of malfunction of external parts. The design concept for the valve dramatically minimizes the number, size and complexity of parts used in monitored irrigation systems as compared with prior devices. The device has inherently tight operational sealing characteristics for greater operating reliability.

It is still a further object of the present invention to provide a device as characterized above which utilizes positive air exit pressure through its porous moisture sensing media to determine when target plants require moisture. In contrast, most related prior art uses a vacuum to pull water and air from the soil through the porous sensing media to make the determination. The porous media wall is less susceptible to plugging and surface deterioration with the clean air cyclically pushing soil, water, and any contaminants back out away from the porous wall.

It is still a further object of the present invention to provide a device as characterized above wherein a measure of pressure sustaining and pressure relief functions are provided to insure proper operation of commercial irrigation products used with the invention.

It is still a further object of the present invention to provide a device as characterized above wherein relatively large passageways which are open fully are used, rather than tiny passageways which open only partially as is the case with some prior art devices. This approach alleviates plugging and filtration problems.

Viewed from a first vantage point, it is an object of the present invention to provide a device for controlling soil moisture in plant husbandry and agricultural irrigation. Said device is comprised of a housing, a valve seal and a moisture sensing means. The housing has a diaphragm which partitions the housing into two areas: a water receiving area and an air receiving area. The diaphragm moves in the housing, thus allowing change to the enclosed volume of both said areas. The valve seal is operatively connected to the diaphragm and is strategically oriented thereon to prevent water flow to the water receiving area when appropriate. The air sensing means communicates with the air receiving area and opposes hydraulic pressure of the water on the valve seal to propititiously facilitate the advance of water beyond the device.

Viewed from another vantage point, it is a further object of the present invention to provide an irrigation controller comprised of a housing with a valve disposed therein. The valve disposed in the housing responds to a sensing means. The sensing means in turn responds to ambient moisture conditions to permit the valve to translate from a closed to open position. Further a bypass is coupled to the sensing means assuring unidirectional fluid flow past the valve and through the sensing means, thus preventing fouling of the sensing means.

These and other objects of the present invention will be made manifest when considering the following detailed specification taken in conjunction with the appended drawing figures in which there has been provided a direct acting moisture sensitive valve which senses relative humidity in an environment and allows or prevents fluid flow. The valve assembly includes a hydrophilic controlled porosity moisture sensing element which restrains or allows air chamber evacuation based on relative humidity, a resilient diaphragm separating air and water chambers, said diaphragm also having a central small plunger which travels in a cylinder and is acted upon by inlet fluid pressure, and an air check valve, all contained in a single integral housing.

BRIEF DESCRIPTION OF THE DRAWING FIGURES

FIG. 1 is a side view of the preferred form of the invention.

FIG. 2 is a top view thereof.

FIG. 3 is another side view of the preferred form of the invention, taken from lines 3—3 in FIG. 2, facing the inlet.

FIG. 4 shows the preferred form of the invention in one possible mode of installation.

DESCRIPTION OF PREFERRED EMBODIMENTS

Figure 7:
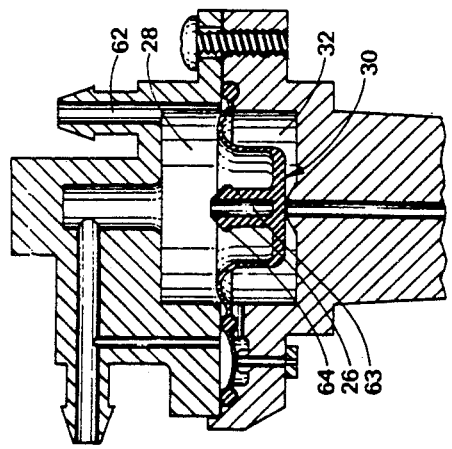
FIG. 7 is the same sectional view as FIG. 5, but showing the second stage of operation.

Referring now to the drawing figures, wherein like reference numerals refer to like parts throughout the various drawing figures, reference numeral 1 is directed to a preferred form of the moisture sensitive device according to the present invention.

The device 1 as shown in FIG. 1 includes an elongate downwardly tapering finned stake 2 and a cap 6 held securely onto a top of the stake by screws 22 or other suitable fastening means. A porous hydrophilic element 4 is mounted in the stake 2 near its pointed lower end. An inlet 60 having a tubing barb 8 and outlet 62 also with a tubing barb 10 are contained in the cap 6. FIGS. 2 and 3 provide additional views for the preferred embodiment.

Figure 5:
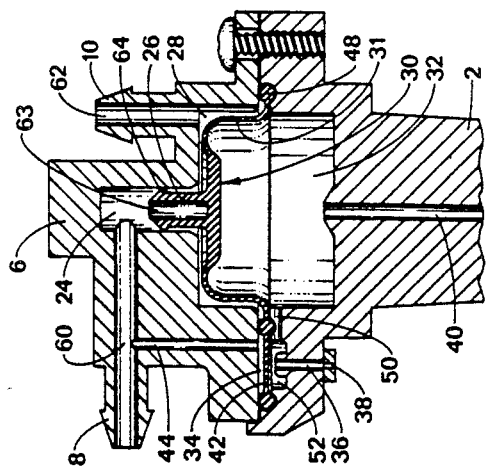
FIG. 5 is a sectional view taken along lines 5—5 of FIG. 2.

The internal working parts of the device are best shown in the cross sectional drawing shown in FIG. 5. A diaphragm unit 30 can be manufactured as a single part, but it contains many portions with individual functions. A small piston 26 reciprocates in a cylindrical vertical inlet fluid chamber 24 and separates the inlet fluid chamber from a main water chamber 28 during certain times of operation. The main water chamber 28 in turn is contiguous with the water chamber outlet 62.

The main body of the diaphragm 30 separates the water chambers 24 and 28 from a main air chamber 32. A small ear portion 42 of the diaphragm unit is located at the left side of FIG. 5 to be used as an air inlet check. Air passageways 36, 38, 50 and 52 are used to supply inlet air to the main air chamber 32.

An air outlet passageway 40 extends downwardly, connecting the main air chamber 32 to the porous air outlet element 4. Similarly, a water passageway 44 extends vertically upward, connecting the water inlet 60 to a water chamber 34 above the ear portion 42 of the diaphragm. The diaphragm unit 30 also has pressure tight edge seals 48 all around both the main air chamber 32, main water chamber 28 and ear portion water chamber 34 and air portion 52.

A view of the preferred embodiment of the invention installed in soil adjacent to a water supply irrigation hose 18 and a plant is shown in FIG. 4. Water pressure is supplied to the device 1 from the irrigation hose 18 through branch tubing 20. If the soil 17 surrounding the porous hydrophilic element 4 is sufficiently dry, the valve device 1 opens by moving the diaphragm 30 to the FIG. 7 position, allowing water to flow to a spray head 14, or other irrigation distribution device through tubing 12 and irrigate the roots 15 of the plant 16. In essence, water moves through branch tube 20, inlet 60, chambers 24 and 28 to outlet 62. If the soil is excessively moist around the porous hydrophilic element 4, the valve device 1 remains closed by having the diaphragm 30 remain between the FIG. 5 and FIG. 6 positions, preventing irrigation. Thus, it is only important that the valve device 1 is installed such that the porous hydrophilic element 4 is near or in an area representative of the plant's root zone 15. Note that FIG. 6 shows the diaphragm 30 in a lower but still sealing position (when compared to FIG. 5) which accommodates the compressibility of air in chamber 32.

Figure 6:
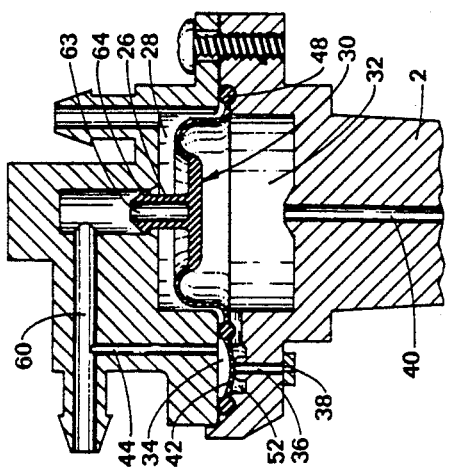
FIG. 6 is the same sectional view as FIG. 5, but showing the first stage of operation.

More specifically, operation of the preferred embodiment of the invention can best be seen by first referring to FIGS. 5 and 6. Water enters the valve device 1 though the inlet passageway 60 and pressurizes the upper chamber 24. Water pressure also acts through passageway 44 to chamber 34 above the ear 42 of the diaphragm 30. This pressure forces the ear portion 42 of the diaphragm down to seal closed the air inlet passageway 36 as shown in FIG. 6. The inlet water pressure force also acts on the piston portion 26 of the diaphragm, resulting in a downward force which is distributed throughout a thick section of the diaphragm 30. The diaphragm 30 is restrained from significant downward movement by air pressure in the main air chamber 32. The diaphragm 30 does not move down sufficiently to allow a piston seal 64 to enter the main water chamber 28 unless air is released from the main air chamber 32 through air outlet passageway 40 and out through the porous element 4 (FIG. 1). The hollow cove 63 in the piston 26 allows the inlet water pressure to assist in forcing the seal 64 radially outward, thereby enhancing the seal functionality.

If air can exit from the main air chamber 32, then the central portion of the diaphragm 30 along with the piston section 26 is forced to the bottom of the main air chamber as shown in FIG. 7. As soon as the piston seal 64 enters into the main water chamber 28, water flows through the main water chamber 28 into the water outlet passageway 62 and out of the valve device 1 to the external irrigation water distribution devices. It should be noted that the piston section 26, 64 of the diaphragm is quickly forced down to the bottom of the main air chamber by the sudden increase in force when the inlet water pressure comes to bear on the entire upper diaphragm. The water path through the valve device 1 thus opens fully for every irrigation event.

Figure 8:
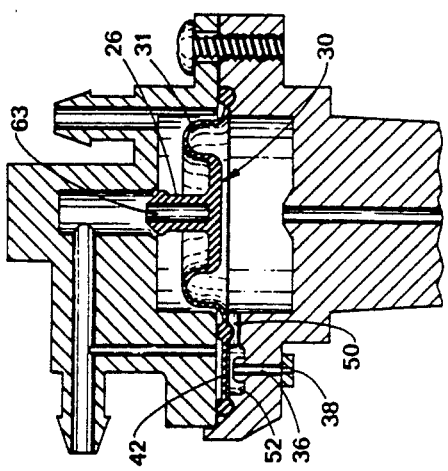
FIG. 8 is the same sectional view as FIG. 5, but showing the third stage of operation.

The movement and position of the diaphragm 30 during the final portion of an operational cycle can be seen in FIG. 8. When the inlet water supply is shut off, there is no net hydraulic pressure on the diaphragm 30. Therefore programmed elasticity of a diaphragm sidewall 31 forces the center diaphragm portion and appurtenant piston 26 back up to their original position as shown in FIG. 5. The cessation of inlet water pressure also allows the diaphragm ear portion 42 to elastically pop back to its original position, allowing air to enter through contiguous passageways 38, 36, 52 and 50 to the main air chamber 32. All portions of the diaphragm remain in this position until water pressure is again supplied to the valve device 1.

Referring back to FIG. 4, the porous air outlet element 4 is located down in the soil 17 in the vicinity of the roots 15 of the plant(s) 16 which need periodic irrigation. Preferably, the porous element 4 has a median pore size of not more than 20 microns nor less than 1 micron. Thus, the porous element 4 holds soil water in its pores until a combination of soil water suction force and air pressure in the air outlet passageway exceed its bubbling pressure of not less than 1 psi nor greater than approximately 15 psi. The actual median pore size chosen for the hydrophilic element 4 depends upon the desired soil moisture level, type of porous material, anticipated operating water pressure and other forces acting upon the diaphragm 30. Therefore, when the soil is sufficiently dry such that irrigation is needed, water is both drawn and forced out of the porous element. This allows air to exit from the main air chamber 32 through the air outlet passageway 40 and porous air outlet element 4 as can be best seen in FIGS. 5, 6. The expulsion of air from the air chamber 32 in turn allows irrigation water to flow through the valve and be distributed to the plant(s).

If the soil around the porous hydrophilic air outlet element 4 is excessively wet, then the pores in the element remain saturated and air cannot escape the porous element. Therefore water is prevented from flowing through the valve.

In many cases, the irrigation water supply to multiple small plants can be accurately regulated by installing the valve in the middle of a group of plants or in a close by area which is representative of the conditions surrounding the root zones of the plants.

The air pressure in the air chamber 32 plus friction and diaphragm elasticity forces are used to offset the force on the small piston 26 from inlet water pressure. Inlet water pressure will typically be in the 10-40 psi range so that in most cases an effective area ratio of greater than 2:1 is desirable between the bottom of the diaphragm 30 in the main air chamber 32 and the small piston 26. The area ratio design concept allows the direct acting characteristics of the valve to be achieved in an economical manner.

The diaphragm elasticity and area ratio can be chosen such that the valve device does not open without a certain minimum inlet pressure and, conversely, the valve opens instantly at a certain maximum inlet pressure, regardless of soil moisture conditions. These pressure sustaining and pressure relief features are very desirable in that they insure operation only within the desirable operating pressure range for the water distribution devices and tubing.

To provide the necessary cyclical or intermittent supply of inlet water pressure to the valve, either manual or automatic cyclical irrigation control can be utilized. Irrigation can thus be controlled to only occur during times when it is most desirable, such as late evening or early morning hours.

Figure 9:
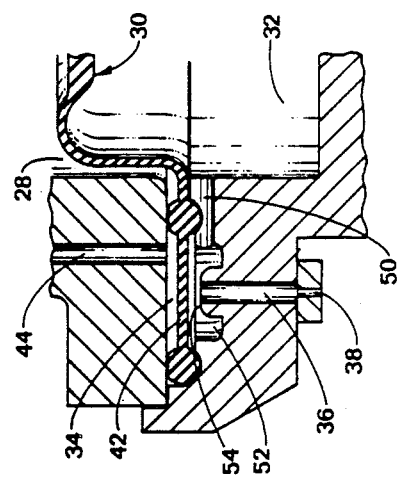
FIG. 9 is an enlarged view of the left side of FIG. 5, showing the air check mechanism in greater detail.

The air check portion of the preferred embodiment of the invention is best shown in FIG. 9, which is an enlargement of the left portion of FIG. 5. The air check stays closed when inlet water pressure is supplied to the valve, the stages of operation shown in FIGS. 6 and 7. The purpose of the air check is to allow air to enter the main air chamber 32 from above ground, which is preferred to trying to draw air back through the porous hydrophilic element 4. It is not possible to draw air back through the porous element 4 if an irrigation cycle has wetted the soil down to the depth of the porous element. It is significant that the air check assembly utilizes water pressure for operation rather than direct air pressure. The water pressure force acting through passageway 44 on the top side of the diaphragm ear 42 forces the ear down onto the seat 54 with a force many times greater than that possible by only using the air pressure. This provides for substantially better sealing than could otherwise be achieved.

Having thus described the invention, it is appreciated that in use and operation, irrigation water is supplied to plants only when localized soil moisture and operational conditions are within a predetermined desirable range. Further, numerous structural modifications are contemplated as being a part of the instant invention as set forth hereinabove and as defined in the claims hereinbelow.

I claim:
1. A method for controlling irrigation for plant husbandry, the steps including;
   forming a water passageway with a removeable obstruction;

placing and removing the obstruction in response to ambient soil moisture conditions;

sensing the ambient soil moisture conditions and directly providing a back pressure using air against the obstruction which resists against water pressure used for irrigation, thereby assuring irrigation only when it is needed.

2. The method of claim 1 including removing the obstruction to provide pressure relief except when irrigation water pressure is excessively high;

and when irrigation water pressure is below a minimum desired level not removing said obstruction regardless of soil moisture conditions, thereby providing pressure sustainment to the irrigation water supply.

3. The method of claim 2 including purging with clean air an instrumentality which senses the moisture.

4. The method of claim 3 including installing a source of water on an inlet of the water passageway and an outlet nozzle downstream therefrom, and amplifying the effect of air versus water pressure.

5. The method of claim 4 including purging the moisture sensing instrumentality by using a check valve which receives air from ambient conditions upon removing residual water pressure.

6. The method of claim 5 including holding the obstruction in an open position thereby allowing the free passage of water therebeyond between the inlet and the outlet when the moisture sensing instrumentality indicates a need for further water into the soil as reflected by the movement of capillary water from a porous moisture sensing instrumentality into the soil as a function of soil moisture and the resultant change in the moisture sensing instrumentality's ability to withhold or pass air.

7. The method of claim 6 including isolating the water portion of the irrigation controller from an air portion.

8. The method of claim 7 including forming the downstream edge of the water passageway with a tapering thereby allowing the obstruction to be selfcentering.

9. The method of claim 8 including forming the device as a stake having a housing within which the obstruction is placed and placing the stake adjacent the plant.

10. The method of claim 9 including forming a hollow cove from an inlet side of said diaphragm, and inlet water pressure expanding the seal radially to provide a tight seal against the inlet water.

11. A device for controlling fluid flow based on moisture content in a porous media comprising, in combination:

a housing having a diaphragm which partitions said housing into two areas: a fluid receiving area and an air receiving area, said diaphragm moving in said housing to change enclosed volume of said areas;

a valve seal operatively connected to said diaphragm, said seal strategically oriented to interrupt or allow fluid flow through said fluid receiving area upon appropriate diaphragm movements;

and moisture sensing means directly communicating with said air receiving area and with air pressure in said air receiving area directly opposing hydraulic pressure of the fluid on said valve seal through said diaphragm to propititiously prevent or allow advance of fluid beyond said device.

12. The device of claim 1 wherein said diaphragm includes said seal extending upwardly from said diaphragm, said seal having a free end which reciprocates within and below a complementally configured bore to selectively completely obturate said bore or to be completely free of said bore.

13. The device of claim 3 wherein said diaphragm is formed from a substantially inverted cup-shaped membrane having a thickened top wall and a downwardly and peripherally extending annular side wall.

14. The device of claim 1 wherein said valve seal of said diaphram has one surface area which is smaller than an area of said diaphragm which faces said air receiving area, thereby enabling a lesser air pressure to restrain a greater fluid pressure.

15. An irrigation control device, comprising in combination:

a housing;

moisture sensing means;

a valve disposed in said housing operatively conditioned by said moisture sensing means to permit translation from a closed to a full open position;

said moisture sensing means for allowing translation of said valve responsive to ambient soil moisture conditions;

and an air check communicating with ambient air coupled to said moisture sensing means preventing sustained negative air pressure with unidirectional air flow means coupled to said sensing means to prevent fouling of said sensing means by forcing air only from said air check out through said sensing means.

16. The control device of claim 15 wherein said valve is integrally formed with a valve diaphragm which moves in response to changes in pneumatic pressure versus inlet water pressure, in order to pass water through said controller.

17. The control device of claim 16 wherein said sensing means is formed from hydrophilic material capable of restraining air pressure up to a designated bubble point as a function of ambient moisture in soil surrounding the moisture sensing means.

18. The control device of claim 17 wherein said air check includes a branch circuit from a source of water, an opening to air above the surface of soil being monitored, and a parasitic diaphragm interposed between said water branch and air whereupon absence of water pressure allows air to pass from said air check and to said valve diaphragm.

19. The control device of claim 18 wherein said air check opening is coupled in series through said valve to said moisture sensing means.

20. The control device of claim 19 wherein there is a surface area ratio on opposed sides of said valve providing an amplification effect such that a lower air pressure can restrain a higher inlet water pressure.

21. The control device of claim 20 wherein said ratio between said valve and valve diaphragm is less than one to two and greater than one to twenty.

22. A device for controlling fluid flow based on moisture content in a porous media comprising, in combination:

a housing having a diaphragm which partitions said housing into two areas: a fluid receiving area and an air receiving area, said diaphragm moving in said housing to change enclosed volume of said areas;

a valve seal operatively connected to said diaphragm, said seal strategically oriented to interrupt or allow fluid flow through said fluid receiving area upon appropriate diaphragm movements;

and moisture sensing means directly communicating with said air receiving area and opposing hydraulic pressure of the fluid on said valve seal to propitiously prevent or allow advance of fluid beyond said device, wherein said diaphragm is formed from a substantially inverted cupshaped membrane having a thickened top wall and a downwardly and peripherally extending annular side wall, wherein said diaphragm includes said seal extending upwardly from said thickened portion, said seal having a free end which reciprocates within and below a complementally configured bore to selectively obturate said bore or to be completely free of said bore, wherein said diaphragm includes a peripherally extending sealing bead, and outboard one peripheral edge of said bead, a parasitic diaphragm which monitors the absence or presence of inlet fluid pressure, and an air check valve seal operatively conditioned by said parasitic diaphragm and communicating with said air receiving area whereby in the absence of inlet fluid pressure, said air check valve is open, allowing the recharge of said air receiving area through a designated port and preventing a sustained vacuum condition.

23. The device of claim 22 wherein said device is embodied substantially as a stake having a tapering lower portion which terminates substantially in a spike shaped point, said spike shaped point formed from a plurality of radially outwardly extending vanes whereby placement in soil adjacent a plant whose soil is to be monitored can occur without said device being readily disrupted from its locale.

24. The device of claim 23 wherein said housing includes an inlet which attaches to a source of fluid, an inlet passageway communicating with said valve seal through said bore in fluid communication with said inlet;

and an outlet extending from said housing's fluid receiving area and communicating with means for distributing the fluid beyond said device, said diaphragm disposed within a substantially cylindrical cavity of said housing with said diaphragm reciprocating within said cylindrical cavity, and said moisture sensing means disposed near a lower most extremity of said stake with a vertically extending passageway communicating said moisture sensing means with said cylindrical cavity.

25. A device for controlling fluid flow based on moisture content in a porous media comprising, in combination:

a housing having a diaphragm which partitions said housing into two areas: a fluid receiving area and an air receiving area, said diaphragm moving in said housing to change enclosed volume of said areas;

a valve seal operatively connected to said diaphragm, said seal strategically oriented to interrupt or allow fluid flow through said fluid receiving area upon appropriate diaphragm movements;

and moisture sensing means directly communicating with said air receiving area and opposing hydraulic pressure of the fluid on said valve seal to propitiously prevent or allow advance of fluid beyond said device, wherein said diaphragm includes a peripherally extending sealing bead, and outboard one peripheral edge of said bead, a parasitic diaphragm which monitors the absence or presence of inlet fluid pressure, and an air check valve seal operatively conditioned by said parasitic diaphragm and communicating with said air receiving area whereby in the absence of inlet fluid pressure, said air check valve is open, allowing the recharge of said air receiving area through a designated port and preventing a sustained vacuum condition.

26. The device of claim 25 wherein said diaphragm includes said seal extending upwardly from said diaphragm, said seal having a free end which reciprocates within and below a complementally configured bore to selectively obturate said bore or to be completely free of said bore.

27. The device of claim 26 wherein said diaphragm is formed from a substantially inverted cup-shaped membrane having a thickened top wall and a downwardly and peripherally extending annular side wall.

28. The device of claim 27 wherein said device is embodied substantially as a stake having a tapering lower portion which terminates substantially in a spike shaped point, said spike shaped point formed from a plurality of radially outwardly extending vanes whereby placement in soil adjacent a plant whose soil is to be monitored can occur without said device being readily disrupted from its locale.

29. The device of claim 28 wherein said housing includes an inlet which attaches to a source of fluid, an inlet passageway communicating with said valve seal through said bore in fluid communication with said inlet;

and an outlet extending from said housing's fluid receiving area and communicating with means for distributing the fluid beyond said device, said diaphragm disposed within a substantially cylindrical cavity of said housing with said diaphragm reciprocating within said cylindrical cavity, and said moisture sensing means disposed near a lower most extremity of said stake with a vertically extending passageway communicating said moisture sensing means with said cylindrical cavity.

30. A device for controlling fluid flow based on moisture content in a porous media comprising, in combination:

a housing have a diaphragm which partitions said housing into two areas: a fluid receiving area and an air receiving area, said diaphragm moving in said housing to change enclosed volume of said areas;

a valve seal operatively connected to said diaphragm, said seal strategically oriented to interrupt or allow fluid flow through said fluid receiving area upon appropriate diaphragm movements;

and moisture sensing means directly communicating with said air receiving area and with air pressure in said air receiving area directly opposing hydraulic pressure of the fluid on said valve seal through said diaphragm to propititiously prevent or allow advance of fluid beyond said device;

wherein said valve seal of said diaphragm has one surface area which is smaller than an area of said diaphragm which faces said air receiving area, thereby enabling a lesser air pressure to restrain a greater fluid pressure;

wherein a sustained negative pressure defining a vacuum condition in said air receiving area is prevented by an air check valve in communication with said air receiving area;

said air check valve remains tightly closed when positive air pressure exists in said air receiving area.

31. The device of claim 30 including elastic resilient means with said diaphragm for repositioning said diaphragm and valve seal when inlet fluid pressure ceases.

32. The device of claim 31 wherein said air check valve is operated by inlet fluid pressure to provide greater available sealing force.

33. The device of claim 32 wherein said moisture sensing means is an open porous element with a controlled pore size distribution such that said element's fluid bubbling pressure is a desired value, said value ranging between 1 and 15 psi.

* * * * *